United States Patent [19]

Hall

[11] 4,185,812

[45] Jan. 29, 1980

[54] BLOW MOLDING PALLET ASSEMBLY FOR CONVEYING ONE OR MORE WORKPIECES

[75] Inventor: Adrian B. Hall, Fairfield, Ohio

[73] Assignee: Cincinnati Milacron Inc., Cincinnati, Ohio

[21] Appl. No.: 816,596

[22] Filed: Jul. 18, 1977

[51] Int. Cl.² ............................................. B23Q 1/18
[52] U.S. Cl. ..................................... 269/56; 198/345
[58] Field of Search ............... 198/345, 486, 654, 695, 198/696; 425/DIG. 108, 117, 118; 279/1 L; 269/56, 254 R, 32

[56] References Cited

U.S. PATENT DOCUMENTS

| | | | |
|---|---|---|---|
| 2,337,528 | 12/1943 | Stuckert et al. | 198/695 |
| 3,386,726 | 6/1968 | Lorenz | 269/32 |
| 3,711,106 | 1/1973 | Hogan et al. | 279/1 L |
| 3,888,341 | 6/1975 | Konkal et al. | 198/345 |
| 4,149,620 | 4/1979 | Rosensweig | 198/345 |

Primary Examiner—Robert C. Watson
Attorney, Agent, or Firm—Daniel P. Worth

[57] ABSTRACT

A pallet assembly is disclosed for use in simultaneous transfer of four preheated plastic preforms from an oven, through a blow mold where they are blown into bottles to a location where the bottles are discharged. The pallet has a base (shuttle) on which is mounted a plurality of pilot bushings for locating the pallet relative to the blow mold and other locations; four (one for each preform) preform registering means (stop rings), each to vertically locate and horizontally center each preform; a sliding pair of opposed V-jaws mounted adjacent each stop ring to hold the preform thereagainst; and V-jaw actuating means (in the form of cranks secured on shafts) to open and close the jaws in timed relation to the other loading, blowing, and discharge operations. The shuttle has guides and latches for coaction with adjacent equipment to guide it through the cycle of events.

9 Claims, 9 Drawing Figures

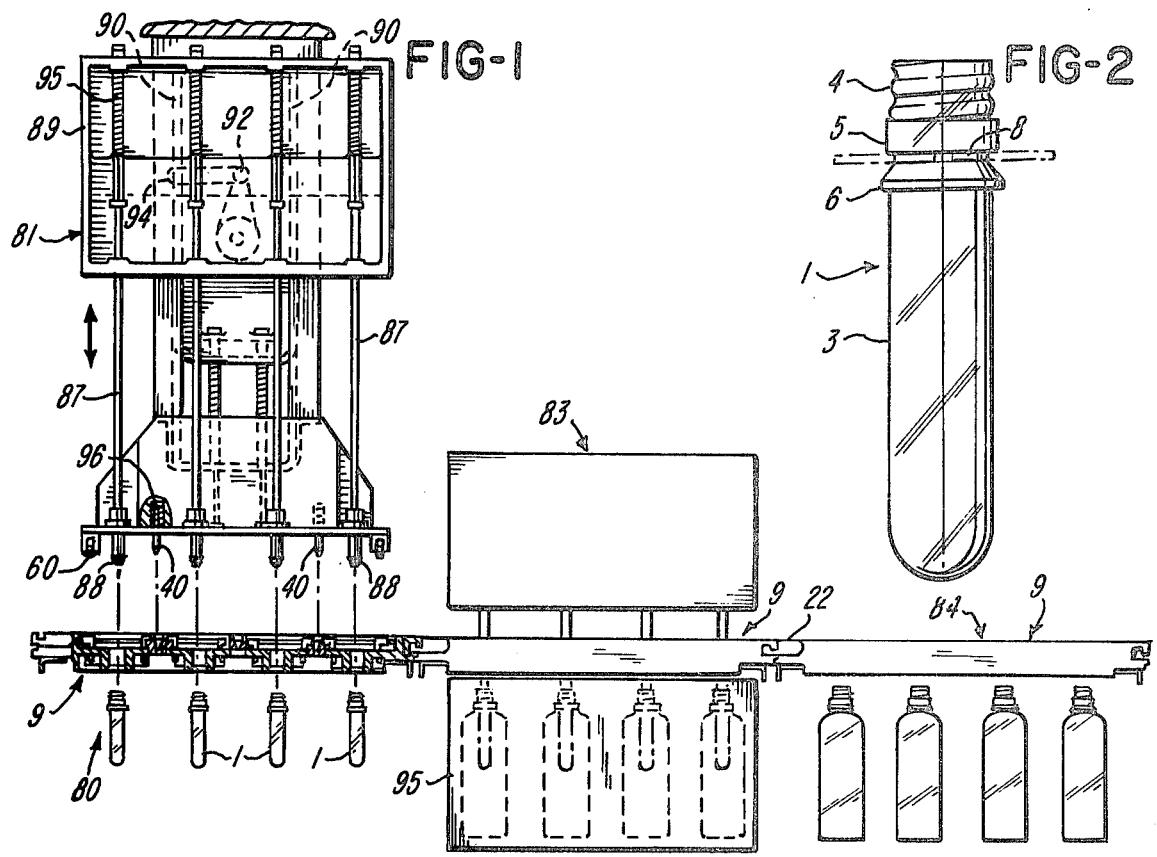
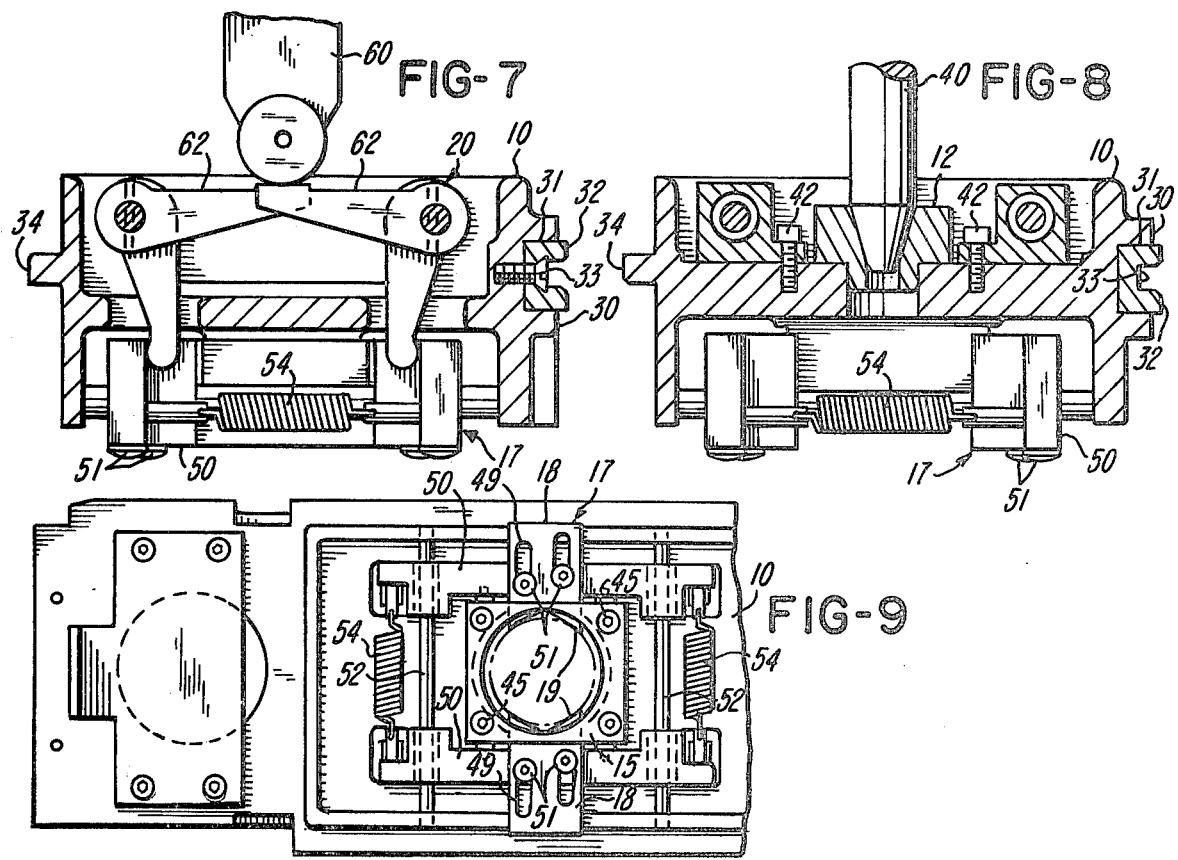

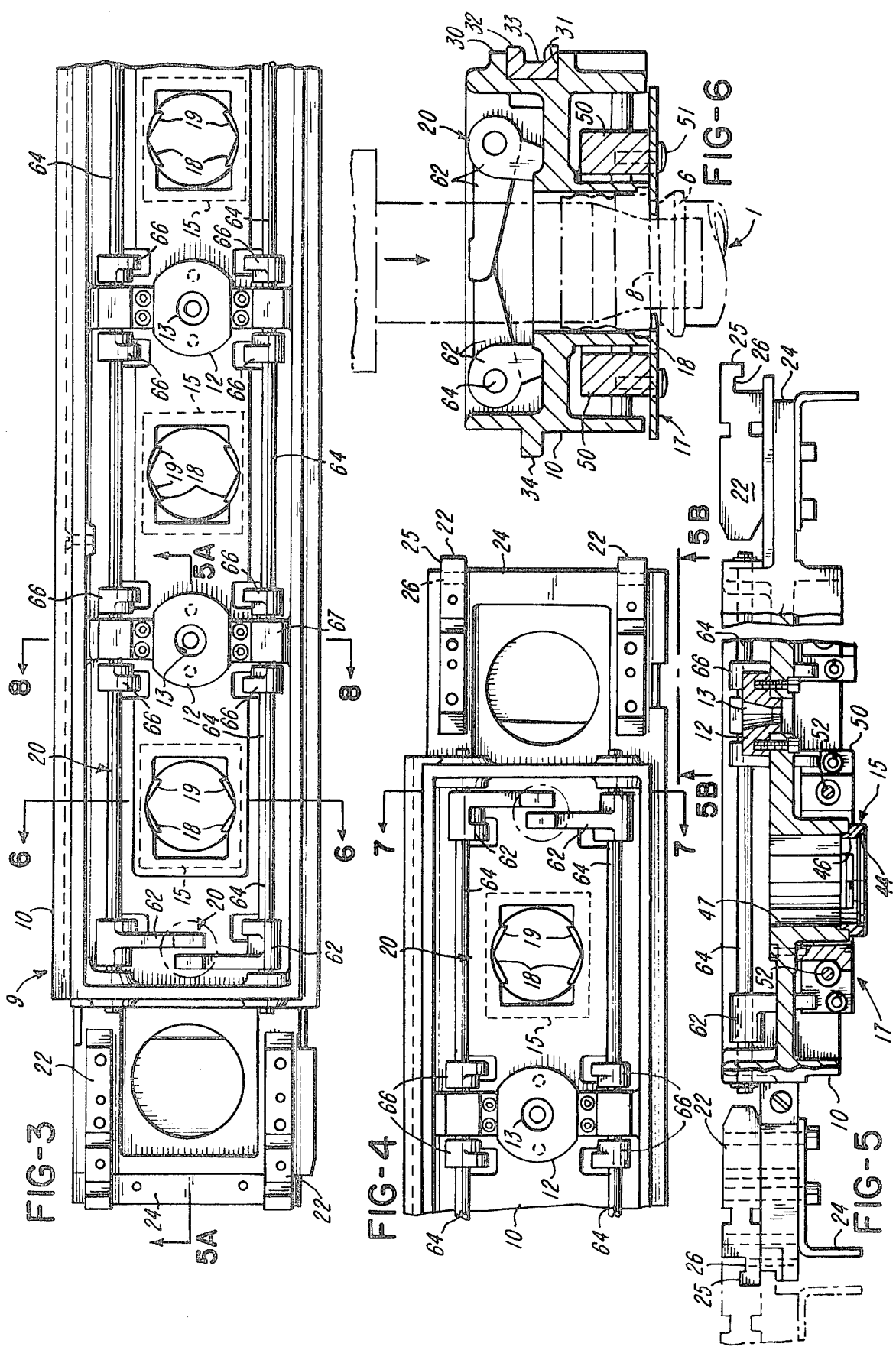

BLOW MOLDING PALLET ASSEMBLY FOR CONVEYING ONE OR MORE WORKPIECES

BACKGROUND AND SUMMARY OF INVENTION

The present invention relates to an improvement in a pallet assembly for transferring one or more workpieces between locations during which transfer a manufacturing operation takes place. One aspect of the invention is a pallet assembly having parts which are adjustably secured in place whereby the same can be altered as needed to receive workpieces of different sizes. An aspect of the invention is a pallet assembly for transferring a plurality thermoplastic resin preforms through a blow molding operation and thereafter releasing the blown product in connection with which the present invention will be described.

Blow molding thermoplastic organic resins to form hollow containers such as bottles for beer, carbonated beverages, and the like is a known art and is the preferred use for the present invention. Suitable thermoplastic resins include resins which are biaxially orientable such as polethylene terephthalate and polypropylene. The biaxial orientation property requires delivering the resin to the blow mold at a temperature where it can so orient, which is generally within the range between the resin softening point and the resin melting point.

The present invention is called a pallet assembly and provides a means to transport an injection molded preform made of the resin from a preheating oven or other means for adjusting temperature (e.g. through a cooler from the injection mold) to the blow mold thence to a discharge point—or more broadly from one location where the means is loaded with a workpiece, through a manufacturing location such as a blow molding procedure, then to a second location for discharge.

The present invention is adapted to handle such resin for blow molding in the form of an injection molded hollow preform which in turn is shaped like a test tube that has external threads about its open end. The body of the preform has been heated to an orienting temperature but the threaded end has been kept cool, unheated because such end is not to be blown. Typically, such a preform has a tamperproof ring at the bottom of the threads and a stacking ring underneath the tamperproof ring: the axial space between these rings is preferably the portion of the preform gripped by the pallet of the present invention.

The present invention is deemed an improvement in reheat blow molding of injection molded thermoplastic preforms and provides positive control of the prefrom upon presenting it to the blow mold.

The present invention does not in any way include the peripheral equipment such as the oven; means to transport from the oven to the pallet; pallet loading or unloading means; or the mold design. The present invention relates to a pallet per se which comprises—a pallet shuttle constituting a base on which the other members of the assembly are mounted; locator means on said shuttle for positively locating said shuttle relative to adjacent machine elements; a workpiece securing and locating assembly supported on said shuttle further comprising guide means mounted on said shuttle, a pair of jaws for engaging a workpiece therebetween mounted on said guide means at least one of which jaws is reciprocably and adjustably to move between closed and open positions which respectively are the positions for securing a workpiece and for receiving or releasing a workpiece, means for biasing said jaws together, a workpiece locating member supported on said shuttle to receive and register a workpiece with reference to said shuttle, said jaws being arranged to reciprocate and hold a workpiece against said locating member, and means supported on said shuttle to move the jaws apart to receive, secure, and release a workpiece.

In the preferred embodiment the pallet is constructed so that it can be adjusted to accommodate different sizes of preforms (workpieces), including means to adjustably mount the jaws so their spacing can be changed and removably mounting the locating member. An annular shaped ring preferably serves as the locating member and vertically locates and centers the preform.

Other features of the invention will become apparent from the detailed description when read in conjunction with the drawings wherein FIG. 1 is a partially schematic side view of a blow molding system that uses the instant pallet assembly;

FIG. 2 is a side view of a typical injection molded preform as contemplated for use in the present invention and showing in dotted lines the manner of its engagement by a retaining means;

FIG. 3 is a partial top view of the left hand part pallet assembly showing the locator bushing and the stop ring;

FIG. 4 is the remainder of the top view of FIG. 3;

FIG. 5 is a horizontal section view on 5A—5A and a side view 5B—5B of FIGS. 3 and 4;

FIGS. 6, 7 and 8 are section views on 6—6, 7—7, and 8—8 respectively in FIGS. 3, 4, 3; and FIG. 9 is a bottom view of the pallet showing the jaws and their carriage means.

THE PREFORM BEING HANDLED (FIG. 2)

The preform 1 (FIG. 2) is of injection molded thermoplastic biaxially orientable material which will so orient upon being blown in a mold at a certain temperature after release from the instant pallet. For example, polyethylene terephthalate orients in the range from about 200° F. to 250° F. It has a hollow body 3 shaped like a test tube with an externally threaded lip 4 above a pilfer proof ring 5 which is above a support ring 6. The space 8 between the two rings 5,6 provides an annular groove by which the present pallet grips the preform and provides positive control.

The preform is not blow molded in the region of threads, rings 4,5,6 hence is not heated in such region. For this reason the preform is handled (e.g. FIG. 2) and gripped (FIG. 6) in this region until the blow molding has been accomplished.

Construction of Pallet Assembly

The pallet assembly 9 has several components each of which bears further discussion: the pallet base or shuttle 10 on which the other components are mounted; locator means 12 comprising a plurality of shot pin bushings of hardened steel having a tapered hole 13 therein; a plurality of stop rings 15 for vertically locating and horizontally centering the preforms; preform gripper assemblies 17 that include adjustably mounted reciprocable jaws or fingers 18 having V-shaped slots 19 at the outboard end; and actuating means 20 to open and close the jaws 18 in timed relation with loading and unloading functions responsive to application of force and mechanism external of the pallet.

The pallet shuttle 10 is preferably a casting and is the base on which the other elements are mounted. The shuttle 10 is machined as needed so that the other components can be fitted and supported properly on the base. The pallet connects to adjacent pallets by means of a plurality of latches 22 which are bolted in pairs on end tab 24 that are integral and extend longitudinally from the main body of the shuttle. Each of these latches has a locking head and recess 25,26 to enable connection with mating means similarly shaped on an adjacent shuttle as illustrated in FIGS. 1, 5. To accomplish this with a minimum diversity of parts, all of the latches are made alike and they are mounted with the recess facing down at one end (to the right in FIG. 5) and mounted with the recess facing up (left in FIG. 5). The way that the latches work is to move additional shuttle assemblies perpendicular to the plane of the platen as viewed in FIG. 1 thereby to cause the latchhead and recess on adjacent units to engage. A similar motion perpendicular to the plane of the paper disengages. Engagement and disengagement is achieved without the use of moving latch parts.

Viewed in longitudinal cross-section, (FIGS. 6, 7, 8) the shuttle 10 resembles an H beam with a series of bosses and apertures. The flanges of the beam are preferably shaped to form rails 30 for engagement with supporting structure or pallets as the case may be. One side of the shuttle has a longitudinal slot 31 into which is fitted a female bearing member 32 having a groove 33. Preferably bearing member 32 is made of fabric that is impregnated with a thermoset resin such as a phenol formal dahyde resin. The bearing member 32 likewise has a groove in it for engagement with adjacent machine elements 34 such as rail 34 on pallets or the table or other member which supports the pallets.

The other flange of the shuttle or base contains a male bearing member in the form of a projecting rail 34 that extends longitudinally of the entire shuttle. Preferably, this male member is of a size or profile that it could sit into the groove 33 formed in the bearings should it be desired to nest pallets longitudinally next to each other.

The locator means 12 are a plurality of bushings having a tapered hole 13 therein. These means are to permit positive location of the pallet relative to adjacent machines by the insertion of a mating shot pin 40 (FIG. 8) into the tapered hole as discussed elsewhere with reference to FIG. 1. Positive location requires at least two of these locator means but three are shown in the preferred construction. The bushing 12 is secured to the web of the shuttle by a pair of bolts 42. The bushings should all be located on the center line of the stop rings 15.

The stop rings 15 are for vertically locating and horizontally centering the preforms by providing an internal shoulder 44 that engages a correspondingly shaped shoulder on the upper side of support rings 6 on the preform. Where it is contemplated that the pallet may have to handle preforms with support rings 6 of respective widely varying dimensions, a different stop ring with a different dimension must be provided for each size to be handled and at each station where a preform is to be engaged—as illustrated, there would have to be four stop rings of each size contemplated. The stop rings are respectively bolted firmly to the underside of the shuttle by four bolts 45 (FIG. 9). An aperture 46 extends completely through the ring and is substantially in register with a hole 47 through the web of the shuttle. The stop ring also has a diametrical groove for supporting the fingers or jaws 18 that engage the preform.

As already noted, jaws 18 are part of the preform gripper assemblies of, a pair of which is provided at each stop ring. Each jaw has a preformed engaging end 19 with a shallow V configuration. The other end of each jaw has a pair of elongated slots 49 by means of which each jaw is adjustably secured to a slide 50 by a pair of bolts 51 in tapped holes. The slides 50 are respectively mounted on a pair of spaced apart ways or guides 52 (FIGS. 5, 9) which conveniently and preferably are circular in shape and fit in bushed holes on their respective sides of the pallet. The slides are biased together by a pair of helical springs 54 in tension and mounted with one at each of the assembly. In the central part of each slide are mounted a pair of stop buttons. These serve as a means to positively locate and space the guide with reference to the stop ring or a co-planar surface that is part of a shuttle.

It can be seen that the jaws can be spaced as needed by loosening the pair of bolts holding each jaw to its respective slide. When setting up the machine, stop rings of the correct size are installed then a preform of the correct size is inserted in its proper position against the stop ring while the jaws are being held loosely by their respective bolts. The jaws are pushed so that their V ends engage preform and the bolts are tightened.

Actuating means 20 comprises an assembly of levers and cranks for transmitting motion to the slides and causing the slides-jaw assemblies to move apart upon command. The command or initiating event is when a part 60 (FIG. 1, 7) of the blow molding machine depresses the bell cranks 62 at the end of the shafts 64. When those are depressed, rotation of the shafts 64 spreads apart the jaws 50 against the bias of the various springs 54. Release of the force on the bell cranks 62 allows the same to close. This opening and closing feature enables loading and unloading the preforms as well as detaining same in place during blow molding. There are a pair of shafts 64 extending longitudinally of the shuttle and mounted revolvably on the shuttle at a plurality of journal bearings 65. At the extreme ends are bell cranks 62 with one arm extending substantially horizontally towards the center line of the pallet. The other arm of each bell crank as well as levers 66 located intermediately along the respective shafts engage each slide adjacent one end thereof so that there are a pair of levers (or bell crank arms) operating each slide. The bell cranks may comprise a pair of levers 66 secured at about right angles on the shelf.

Environment in Which the Invention May be Used (FIGS. 1 and 2

FIG. 1 shows the environment in which the pallet 9 may be and preferably is used. Many of the details are omitted inasmuch as they are already known and are no part of the present invention, indeed some having different inventors.

FIG. 1 illustrates the three most important stations of the operation wherein the pallet is used. These are the left of FIG. 1, a loading station 80 using a so-called picker to pull preforms 1 up into the pallet, a blow molding station, and then a discharge or ejection station.

The preforms 1 are delivered underneath the pallet after being heated to a predetermined temperature in an oven. A machine called a picker 81 is located above the pallet which is to be loaded. The picker heads 87 is driven to reciprocate vertically and is driven down into each preform to engage it. The picker head is basically a cylindrical member having at its end 88 an O-ring around its circumference. The O-ring has a compression fit with the inside of the perform in the neck region. The reciprocating action of the picker drives the plunger down into compression engagement as aforesaid and then reciprocates the picker head with preform attached up into the pallet.

The picker machine comprises a slide member 89 arranged on ways 90 and reciprocated vertically by a rotary actuator 92 which preferably comprises a hydraulic motor turning a crank arm, the end of which works in a slot 93.

The slide 89 has mounted on it a plurality of picker heads 87—illustrated in FIG. 1 as four in number—but in any event corresponding in number to the numbers of preforms to be pulled up into the shuttle. The picker heads are spring biased to their position so that slight overrides at the ends of their stroke are taken up by the springs 95 at the ends.

A pair of spaced apart shot pins 40 engage the locator means. The shot pins are likewise biased as by springs 96 to their positions.

On the outboard ends of the slide 89 are mounted jaw actuators 60 which preferably are rollers but which function to engage the horizontal arms of the bell cranks on the pallet as already described with reference to FIG. 7. When the rotary actuator drives the slide down, the jaw actuators engage the bell cranks 62,66 and spread apart pallet jaws 18 and the picker heads 87 proceed on through the apertures in the pallet to engage the neck of the respective preforms while at the same time the shot pins 40 have engaged their tapered recesses 13 in the pellet. On the return stroke, the slide 89 moves up carrying with it all of the preforms 1 until the latter engage the stop ring (preforms shoulder 8 engates shoulder 44) where they are sort of wiped off the end of the picker head. Before release from the picker head, however, the jaw actuators 60 disengage from the bell cranks 62,66 on the pallet whereupon the jaws 18 close and firmly engage each preform.

After the pallet is loaded, it is moved mechanically (the preferred way) or manually to the blow molding station 83. The preforms are moved in a file between open mold halves 95 the pallet 9 is stopped, the mold halves are closed and the blowing operation takes place. After blowing, the molds 95 are opened and the pallet is once again moved (to the right of FIG. 1) to this time carry the blown product out of the mold to the eject position shown at the right of FIG. 1. In this position, jaw actuators 60 again engage the bell cranks 62 which open the respective jaws or fingers and cause the blown bottles to drop out of the pallet. The pallet is then unhooked at 22 and moved around to the beginning station 80 where the procedure be repeated. As previously explained, the pallet can be loaded and the pallet from which bottles are to be ejected are moved at right angles to the plane of FIG. 1. For this reason the latch 22, 25, 26 at the end of each pallet is constructed at it is to permit such motion while at the same time providing a "train" of pallets that moves from loading to blowing to unloading.

As already explained, the present design affords a convenient means for not only transporting preforms through a blow molding process but also provides a structure that can easily be adjusted to accomodate different sizes of preform.

What is claimed is:

1. A pallet assembly for conveying substantially horizontally a plurality of workpieces each having a circular cross-section from one location through a manufacturing operation to another location comprising the assembly of:
    an elongated pallet shuttle constituting a base on which the other members of the assembly are mounted;
    a plurality of locator means spaced apart along said shuttle for positively locating said shuttle;
    a plurality of workpiece securing and locating assemblies supported longitudinally on said shuttle, each of said assemblies further comprising:
        a pair of ways or guide bars secured laterally of said shuttle,
        a pair of slides mounted on said pair of guide bars to move between closed and open positions which respectively are the positions for securing a workpiece and for receiving or releasing a workpiece,
    means for biasing said slides together,
    a stop ring supported on said shuttle to receive, vertically locate and center a workpiece with reference to said shuttle, said ring having an aperture therethrough with a tapered substantially circular locating surface for receiving and locating a matching surface on said workpiece,
    a finger secured at one end to each slide with the other end extending to within said aperture and toward the other said slide, each finger having at said other end thereof a V-shaped surface for engaging a workpiece and holding it against said stop ring, and
    means supported on said shuttle to move the slides apart to receive, secure, and release a workpiece.

2. A pallet assembly according to claim 1 wherein said means to move the slides comprises a pair of shafts extending longitudinally of said shuttle and substantially perpendicular of said ways,
    a horizontal lever extending from each shaft toward the center line of said pallet thereby to receive forces that will rotate said shaft,
    a pair of levers secured in spaced apart positions along each shaft at a location to engage opposite ends of each slide,
    said means for biasing urging said slide and pairs of levers into engagement with each other, whereby pressure on said horizontal lever causes rotation of said pairs of levers to spread apart said slides against the bias of said biasing means and release of such pressure causes the elements to return to their starting position under the urging of said biasing means.

3. A pallet assembly according to claim 1 wherein said means for biasing is a helical spring connected between said pair of slides.

4. A pallet assembly according to claim 1 further comprising means to adjustably secure said fingers on said slides and means to removably secure said stop rings to said shuttle.

5. A pallet assembly for conveying a workpiece from one location through a manufacturing operation to another location comprising the assembly of:
    an elongated pallet shuttle constituting a base on which the other members of the assembly are mounted;
    locator means on said shuttle for positively locating said shuttle relative to adjacent machine elements;

a workpiece securing and locating assembly supported on said shuttle further comprising
guide means mounted on said shuttle;
a pair of jaws for engaging a workpiece therebetween at least one of which jaws is reciprocably and adjustably mounted on said guide means to move between closed and open positions which respectively are the positions for securing a workpiece and for receiving or releasing a workpiece; and
means for biasing said jaws together;
a workpiece locating member supported on said shuttle to receive, and register a workpiece with reference to said shuttle, said jaws being arranged to reciprocate and hold a workpiece against said locating member; and
means supported on said shuttle to move the jaws apart to receive, secure, and release a workpiece.

6. A pallet assembly according to claim 1 wherein said guide means are mounted substantially laterally of said pallet and said means to move said jaws comprises at least one shaft extending longitudinally of said shuttle and substantially perpendicular to said guide means,
a first lever extending from said shaft toward the center line of said pallet thereby to receive forces that will rotate said shaft,
at least one second lever secured on said shaft at a location to cause said jaws to move as aforesaid,
said biasing means urging said jaws and lever into engagement with each other, whereby application of force to said first lever causes rotation of said second lever to spread apart said jaws against the bias of said biasing means and release of such force causes the elements to return to their starting position under the urging of said biasing means.

7. A pallet assembly according to claim 1 further comprising at least one slide means reciprocably mounted on said guide means and at least one of said jaws being supported on said slide means to move as aforesaid.

8. A pallet assembly according to claim 1 wherein said locating member is a stop ring secured on said shuttle and having an annular shape with an aperture surrounded by a locating surface, said jaws being mounted to reciprocate within said aperture to hold a workpiece against said locating surface.

9. A pallet assembly according to claim 8 further comprising at least one slide means reciprocably mounted on said guide means and at least one of said jaws being supported on said slide means to move as aforesaid.

* * * * *